(12) United States Patent
Choi et al.

(10) Patent No.: US 11,070,121 B2
(45) Date of Patent: Jul. 20, 2021

(54) VIBRATION GENERATING APPARATUS

(71) Applicant: JAHWA ELECTRONICS CO., LTD., Chungcheongbuk-do (KR)

(72) Inventors: Nam Jin Choi, Chungcheongbuk-do (KR); Kyung Hoon Jo, Chungcheongbuk-do (KR); Soon Koo Shim, Chungcheongbuk-do (KR); Young Bin Chong, Chungcheongbuk-do (KR); Chun Choi, Chungcheongbuk-do (KR); Won Gook Lee, Chungcheongbuk-do (KR); Min Goo Lee, Chungcheongbuk-do (KR)

(73) Assignee: JAHWA ELECTRONICS CO., LTD., Chungcheongbuk-do (KR)

( * ) Notice: Subject to any disclaimer, the term of this patent is extended or adjusted under 35 U.S.C. 154(b) by 188 days.

(21) Appl. No.: 16/304,185

(22) PCT Filed: Aug. 4, 2017

(86) PCT No.: PCT/KR2017/008436
§ 371 (c)(1),
(2) Date: Nov. 23, 2018

(87) PCT Pub. No.: WO2018/026231
PCT Pub. Date: Feb. 8, 2018

(65) Prior Publication Data
US 2020/0321845 A1    Oct. 8, 2020

(30) Foreign Application Priority Data

Aug. 4, 2016 (KR) .................... 10-2016-0099584

(51) Int. Cl.
*H02K 33/16* (2006.01)
*H02K 33/18* (2006.01)
(Continued)

(52) U.S. Cl.
CPC ............. *H02K 33/18* (2013.01); *H02K 11/33* (2016.01); *H02K 33/16* (2013.01); *G06F 3/016* (2013.01)

(58) Field of Classification Search
CPC ........... H02K 33/16; B06B 1/04; B06B 1/045
See application file for complete search history.

(56) References Cited

U.S. PATENT DOCUMENTS

| 2003/0114999 A1* | 6/2003 | Shimoda | H02K 33/16 702/56 |
| 2009/0146509 A1* | 6/2009 | Aoyagi | B06B 1/045 310/15 |
| 2011/0278961 A1* | 11/2011 | Jeong | B06B 1/045 310/25 |

FOREIGN PATENT DOCUMENTS

| JP | 2002-200461 A | 7/2002 |
| JP | 2004-153964 A | 5/2004 |

(Continued)

OTHER PUBLICATIONS

Kim etal., Machine Translation of KR200447398, Jan. 2015 (Year: 2015).*

(Continued)

*Primary Examiner* — Quyen P Leung
*Assistant Examiner* — Eric Johnson
(74) *Attorney, Agent, or Firm* — Maier & Maier, PLLC

(57) ABSTRACT

A vibration generating apparatus includes a bracket coupled to a rectangular case to form an inner space, a stator including a circuit board coupled to an upper surface of the bracket and a coil connected to the circuit board, a vibrator including a permanent magnet arranged on an exterior of the coil and a weighted body coupled to an outer circumferential surface of the permanent magnet, and an elastic member connecting the stator and the vibrator and elastically sup- (Continued)

porting the vibrator. The weighted body is polyhedral, and the vibrator moves up-and-down.

5 Claims, 13 Drawing Sheets

(51) Int. Cl.
*H02K 11/33* (2016.01)
*G06F 3/01* (2006.01)

(56) References Cited

FOREIGN PATENT DOCUMENTS

| JP | 2004-266903 | A |   | 9/2004 |
|----|-------------|---|---|--------|
| JP | 2010-282222 | A |   | 12/2010 |
| KR | 10-0933179 | B1 |   | 12/2009 |
| KR | 20-0447398 | Y1 |   | 1/2010 |
| KR | 10-2011-0048311 | A |   | 5/2011 |
| KR | 101455722 | B1 | * | 11/2014 |
| KR | 20150053104 | A | * | 5/2015 |
| KR | 10-2015-0088145 | A |   | 7/2015 |
| KR | 10-2015-005310 | A |   | 8/2015 |
| KR | 10-2015-0096119 | A |   | 8/2015 |
| KR | 101970708 | B1 |   | 4/2019 |

OTHER PUBLICATIONS

Kim et al. Machine Translation of KR100933179, Dec. 2009 (Year: 2009).*
Kim et al., Machine Translation of KR101455722,Nov. 2014 (Year: 2014).*
Lee et al., Machine Translation of KR20150053104, May 2015 (Year: 2015).*
Kawano et al., Machine Translation of JP2004266903, Sep. 2004 (Year: 2004).*
International Search Report dated Nov. 15, 2017 in corresponding International application No. PCT/KR2017/008436; 14 pages including Partial English-language translation.
Office Action dated Sep. 3, 2018 in corresponding Korean Application No. 10-2016-0099584; 8 pages.
Office Action dated Sep. 3, 2018 in corresponding Korean Application No. 10-2017-0178500; 8 pages including English-language translation.
Office Action dated Sep. 3, 2018 in corresponding Korean Application No. 10-2018-0039484; 11 pages including English-language translation.

* cited by examiner

VIBRATION GENERATING APPARATUS

CROSS-REFERENCE TO RELATED APPLICATION

This Application is a Section 371 National Stage Application of International Application No. PCT/KR2017/008436, filed Aug. 4, 2017, the contents of which is hereby incorporated by reference in its entirety.

FIELD

The present invention relates to a vibration generating apparatus, and more specifically, to a vibration generating apparatus capable of improving vibration characteristics by reducing a dead volume of a weighted body while increasing a weight of the weighted body, and capable of preventing vibration and noise by suppressing collision between a case and the weighted body.

BACKGROUND

Recently, a linear vibration generating apparatus used as a notification device at a silence mode for a portable terminal is featured by a short stroke distance and a fast response characteristic at the start and stop due to the elasticity of an elastic member, as compared with a conventional vibration generating apparatus based on eccentric rotation, thus resulting in the improvement in vibration characteristics.

Such a linear vibration generating apparatus generally includes a vibrator including a permanent magnet and a stator which supports the vibrator. Vibration is generated by an up-and-down movement of the permanent magnet due to the interaction between electromagnetic force generated by applying a current to a coil arranged in the stator and magnetic force generated from the permanent magnet.

Specifically, a stator having a coil and a vibrator with a permanent magnet are arranged in a case of the conventional linear vibration generating apparatus, in which vibration is generated by an elastic member which is elastically supported by the permanent magnet.

In addition to the aforementioned structure, a structure of the vibration generating apparatus has also been known, in which a permanent magnet is provided in a stator and a coil coupled to a weighted body is provided in a vibrator.

When the linear vibration generating apparatus generates vibration, the vibrator may not only move up-and-down, but also rotate or swing from side to side due to the elastic member characteristics and residual vibration. As a result, the vibration characteristics are deteriorated and noise can be generated due to the collision with a case.

Further, the weighted body is an important factor for vibration power generation of the linear vibration generating apparatus. The vibration power of weighted body decreases as its weight decreases. Accordingly, there may be a hurdle to increase vibration power because it is difficult to increase a volume of the weighted body inside a case having a predetermined shape and size.

SUMMARY

Therefore, a vibration generating apparatus, which is capable of improving the vibration power by reducing a dead volume of the weighted body and increasing the weight of the weighted body, and capable of preventing vibration and noise by suppressing collision between the case and the weighted body, may be necessary.

It is an object of embodiments of the present invention to improve the vibration power and the response speed of the vibration generating apparatus by reducing the dead volume of the weighted body and increasing the weight of the weighted body.

It is another object of the present invention to ensure the reliability of a product by preventing the degradation of vibration characteristics and noise which may occur when the weighted body rotates or swings from side to side besides the up-and-down movement.

It is still another object of the present invention to ensure high-quality vibration performance and design freedom by increasing space utilization of the vibration generating apparatus.

To this end, a vibration generating apparatus according to the present invention includes a bracket coupled to a rectangular case to form an inner space; a stator including a circuit board coupled to an upper surface of the bracket, and a coil connected to the circuit board; a vibrator including a permanent magnet arranged on an exterior of the coil, and a weighted body coupled to an outer circumferential surface of the permanent magnet; and an elastic member connecting the stator and the vibrator, and elastically supporting the vibrator, wherein the weighted body is polyhedral, and the vibrator may move up-and-down.

Here, the weighted body of the present invention has a horizontal cross-section of an n-polygon (where n is a natural number equal to or greater than 4).

An internal angle of the weighted body of the present invention facing a side of the case, may be greater than 135° and less than 180°, and a chamfer shape or a step may be formed on an upper surface of the weighted body.

Preferably, the weighted body of the present invention may be provided with a curved surface, in which the weighted body of the present invention may further include a flat surface extending from the curved surface.

More preferably, the curved surface of the weighted body according to the present invention may be formed by rotating an inclined portion extending from a flat portion on a longitudinal cross-section of the weighted body toward an outermost direction about a vertical center axis.

Further, the weighted body according to the present invention is provided with a plurality of curved surfaces, in which preferably, the plurality of curved surfaces have different radii of curvature and are formed continuously or discontinuously.

According to an embodiment of the present invention, when viewed in a plan view, the curved surface may include a first curved surface curving an edge portion formed by extending an outermost straight line portion of the weighted body; a second curved surface curving an upper edge portion of an outermost surface with respect to a vertical center axis on a longitudinal cross-section of the weighted body; and a third curved surface curving a lower edge portion of the outermost surface with respect to a vertical center axis on a longitudinal cross-section of the weighted body.

According to an embodiment of the present invention, there is provided a vibration generating apparatus in which a vibrator connected to a stator is elastically supported and moves up-and-down, where a hollow is formed inside the weighted body of the vibrator, an outer side of the weighted body is polyhedral, and a shape of a case forming the stator may be polyhedral.

According to another embodiment of the present invention, a vibration generating apparatus includes a bracket coupled to a rectangular shaped case to form an inner space; a stator including a circuit board coupled to an upper surface of the bracket and a permanent magnet fixed to the bracket or the case; and a vibrator including a coil electrically connected to the circuit board to generate magnetic force corresponding to the permanent magnet and a weighted body coupled to the coil. Here, the weighted body may be formed as a polyhedral shape.

According to embodiments of the present invention, it is possible to improve the vibration power and the response speed of the vibration generating apparatus by reducing the dead volume of the weighted body and increasing the weight of the weighted body.

According to embodiments of the present invention, it is also possible to ensure the reliability of a product by preventing the degradation of vibration characteristics and noise which may occur when the weighted body rotates or swings from side to side besides the up-and-down movement.

Further, according to embodiments of the present invention, it is possible to ensure high-quality vibration performance and design freedom by increasing space utilization of the vibration generating apparatus.

DETAILED DESCRIPTION

Figure 1:
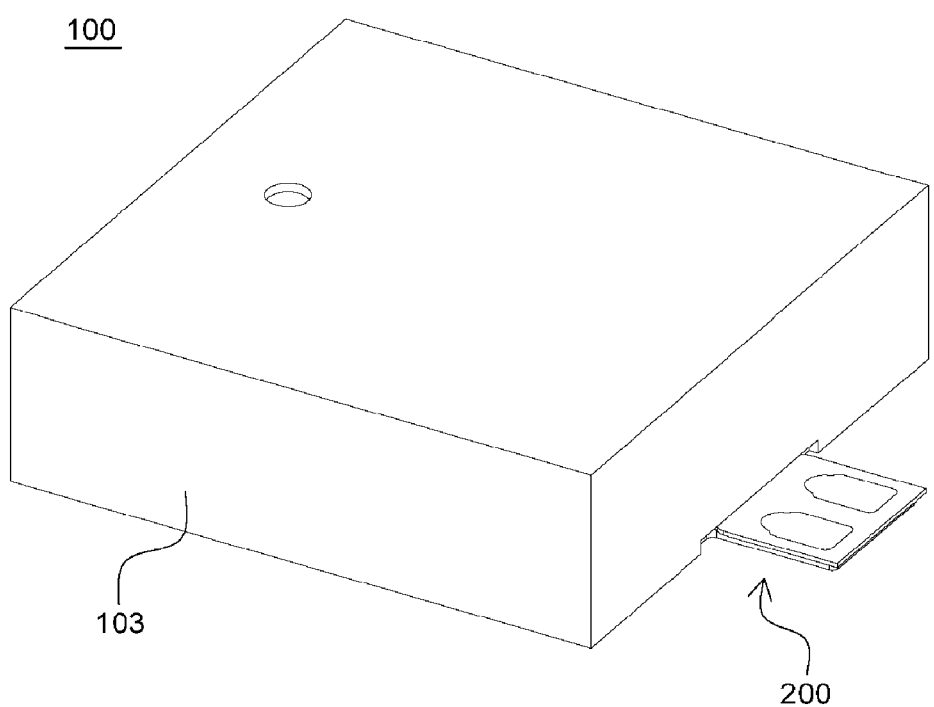
FIG. 1 is a perspective view of a vibration generating apparatus according to an embodiment of the present invention.

Hereinafter, preferred embodiments of the present invention will be described in detail with reference to the accompanying drawings. However, the present invention is not limited to the embodiments described herein but may be embodied in other forms. Rather, the embodiments disclosed herein are being provided so that this disclosure will be thorough and complete, and will fully convey the concept of the invention to those skilled in the art. Like reference numerals designate like elements throughout the specification.

Figure 2:
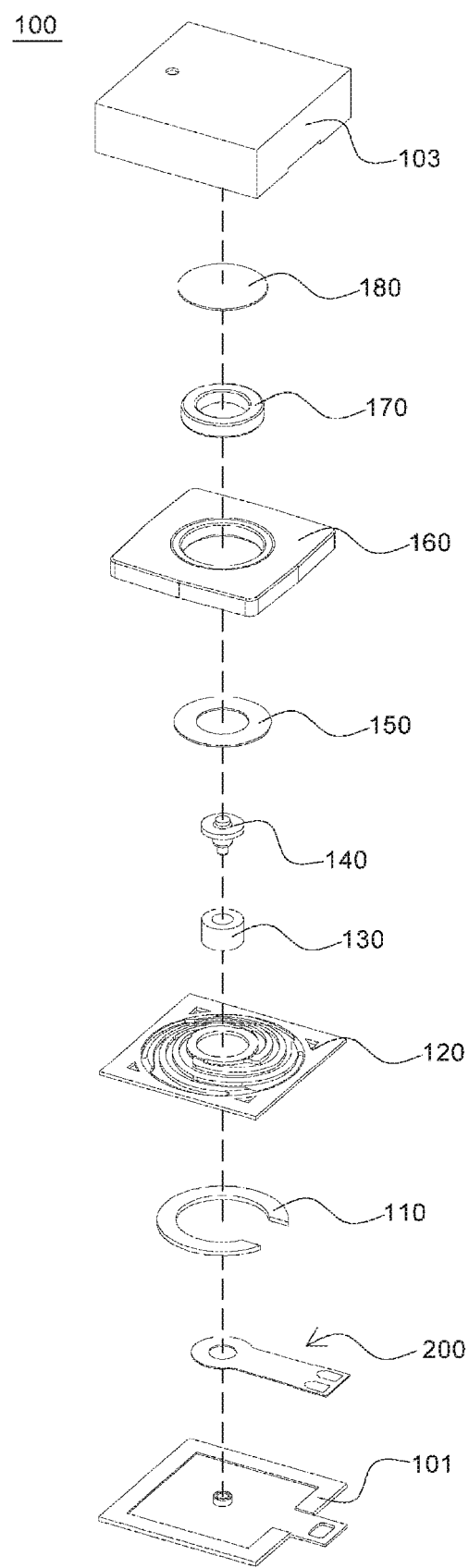
FIG. 2 is an exploded perspective view of a vibration generating apparatus according to an embodiment of the present invention.
Figure 3:
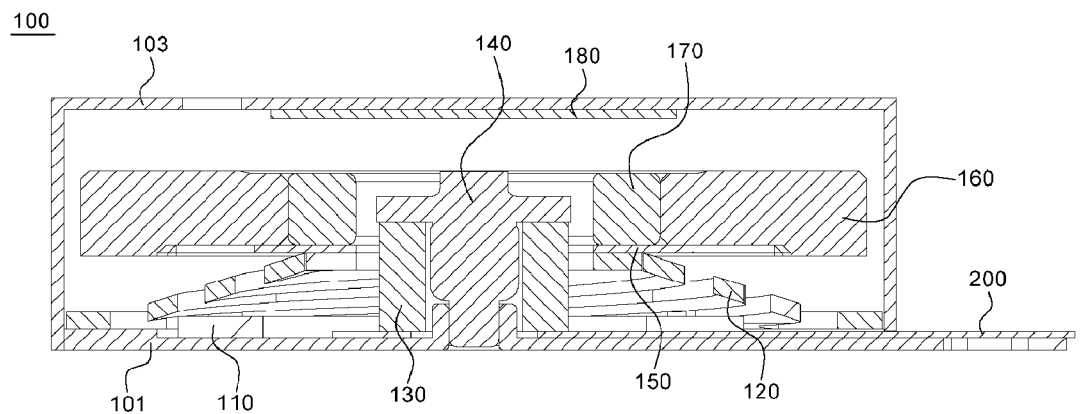
FIG. 3 is a side view of a vibration generating apparatus according to an embodiment of the present invention.
Figure 4:
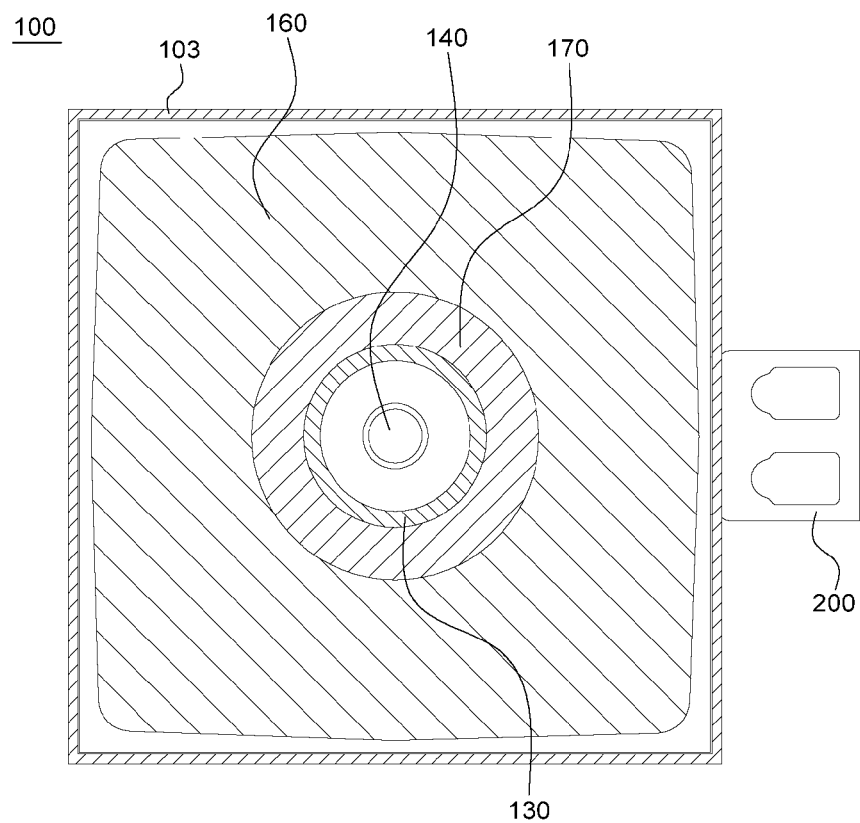
FIG. 4 is a plan view of a vibration generating apparatus according to an embodiment of the present invention.

FIG. 1 is a perspective view of a vibration generating apparatus according to an embodiment of the present invention, FIG. 2 is an exploded perspective view of a vibration generating apparatus according to an embodiment of the present invention, and FIG. 3 is a side view of a vibration generating apparatus according to an embodiment of the present invention. FIG. 4 is a plan view of a vibration generating apparatus according to an embodiment of the present invention.

Referring to FIGS. 1 to 4, a vibration generating apparatus 100 according to the present invention may include a stator including a bracket 101 coupled to a case 103, a circuit board 200 coupled to an upper surface of the bracket 101, a coil 130 connected to the circuit board 200, and a yoke 140 arranged inside the coil 130; a vibrator including a permanent magnet 170 arranged on an exterior of the coil 130, and a weighted body 160 coupled to an outer circumferential surface of the permanent magnet 170; and an elastic member 120 connecting the stator and vibrator, and elastically supporting the vibrator.

Specifically, the case 103 and the bracket 101 are coupled to each other to form a receiving space therein, the circuit board 200 is coupled to the upper surface of the bracket 101, and the yoke 140 is provided inside the coil 130 attached to the circuit board 200. The stator is comprised of the case 103 and the bracket 101, the circuit board 200, the coil 130, and the yoke 140.

The vibrator is comprised of a ring-shaped permanent magnet 170 arranged on the exterior of the coil 130, and the weighted body 160 coupled to the outer circumferential surface of the permanent magnet 170. A first damper 110 and a second damper 180 may be provided on a lower and an upper of the case 103 to mitigate impact due to vibration.

An elastic member 120 is interposed between the stator and the vibrator for elastically supporting an up-and-down movement of the vibrator. A plate 150 may be provided to connect the vibrator and the elastic member 120. In the vibration generating apparatus 100 configured as described above, the vibrator vibrates up-and-down as an alternating current power source is applied through the circuit board 200.

As shown in FIGS. 1 to 4, the case 103 may have a rectangular shape, and thus, the weighted body 160 may be polyhedral. Particularly, in the present embodiment, a shape of the weighted body 160 may be rectangular like the case 103.

Conventionally, the case 103 has a circular shape, and the weighted body 160 also has a circular shape accordingly. A space in which the vibration generating apparatus 100 is installed in a portable terminal is generally rectangular.

Therefore, when the vibration generating apparatus 100 is formed in a circular shape, a dead volume is inevitably generated, resulting in a reduction in the vibration power and the response speed.

In contrast, the vibration generating apparatus 100 according to the present embodiment provides a rectangular case 103. Accordingly, since a cross section of the weighted body 160 is rectangular with respect to a horizontal direction perpendicular to a vibration direction, it is possible to reduce the dead volume and increase a weight of the weighted body 160, thereby improving the vibration power and the response speed.

Figure 5:
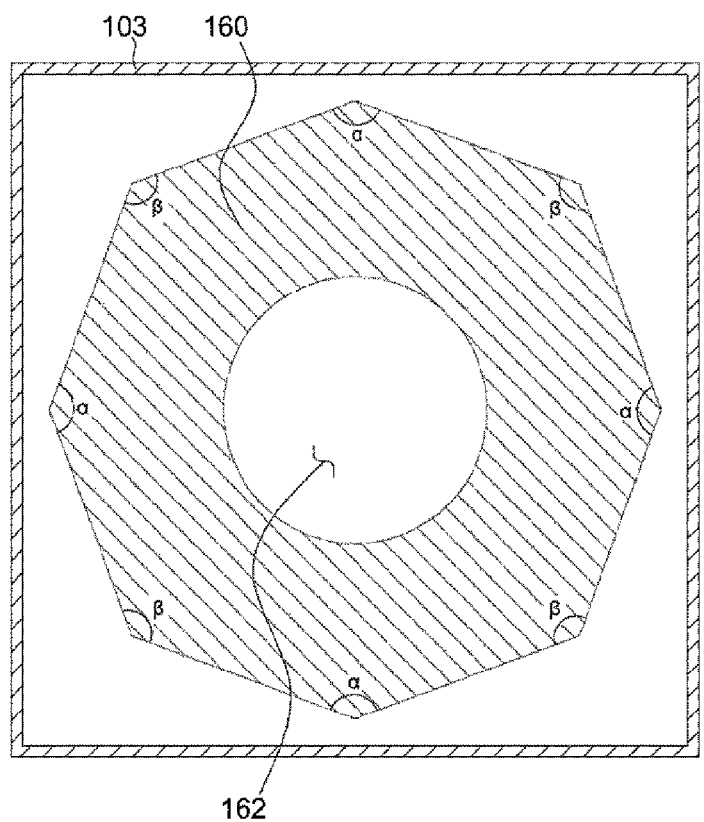
FIG. 5 is a plan view illustrating a shape of a weighted body according to a further embodiment of the present invention.
Figure 6:
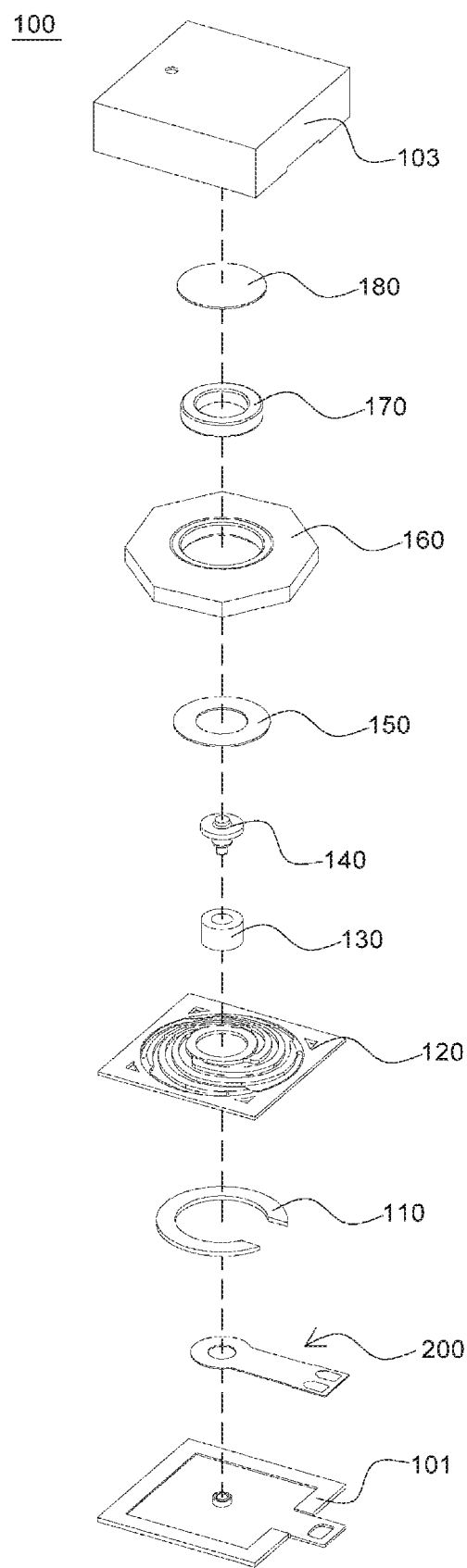
FIG. 6 is an exploded perspective view of a vibration generating apparatus according to the further embodiment of the present invention.
Figure 7:
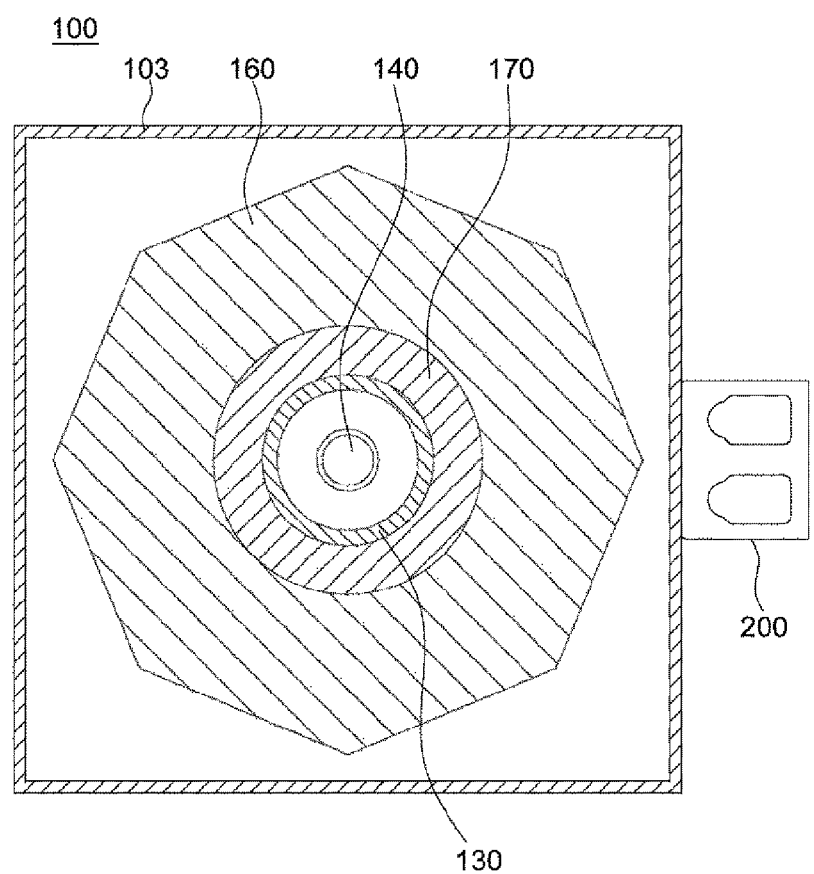
FIG. 7 is a plan view of a vibration generating apparatus according to the further embodiment of the present invention.

FIG. 5 is a plan view illustrating a shape of a weighted body 160 according to further embodiment of the present invention, FIG. 6 is an exploded perspective view of a vibration generating apparatus 100 according to further embodiment of the present invention, and FIG. 7 is a plan view of a vibration generating apparatus according to a further embodiment of the present invention.

Referring to FIGS. 5 to 7, in the vibration generating apparatus 100 according to the embodiment, the case 103 is a rectangular shape as in the previous embodiment, but the weighted body 160 may be polyhedral, in particular, octagonal when viewed in a horizontal cross-section or a plane.

Here, an internal angle α of the weighted body 160 facing a side of the case is preferably greater than 135° and less than 180°. An internal angle β of the weighted body 160 facing a corner of the case may be larger than 90° and smaller than 135°.

In an embodiment of the present invention, the elastic member 120 is spiral. Due to this shape of the elastic member 120, the weighted body 160 moves in a rotating direction even when the weighted body 160 vibrates up-and-down. Accordingly, the end of the weighted body 160 may collide with a side of the case 103, thereby degrading vibration characteristics and generating noise.

However, the vibration generating apparatus 100 according to the embodiment may prevent the weighted body 160 from colliding with the case 103 even if the weighted body 160 moves in a rotational direction, by determining the internal angle α of the weighted body 160 facing the side of the case, in a range of greater than 135° and less than 180°, and determining the internal angle β of the weighted body 160 facing the corner of the case, in a range of larger than 90° and smaller than 135°.

In other words, in the vibration generating apparatus 100 according to the embodiment, it is possible to prevent a collision by setting a certain margin such that the weighted body does not collide with the case 103, even if the weighted body 160 rotates. Here, a range of the internal angles of the weighted body 160 is a value capable of ensuring a maximum volume while preventing a collision in the rectangular case 103.

As shown in FIG. 5, a hollow 162 having a certain inner diameter is formed inside the weighted body 160 forming the vibrator in order to match with a configuration of the stator including the coil 130 or the yoke 140, and an outer side of the weighted body 160 may be polyhedral such as octagonal to increase a volume.

Figure 8A:
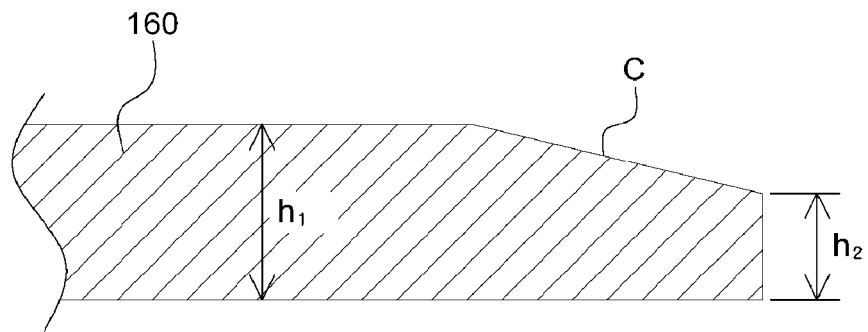
FIG. 8(a) is a partial cross-sectional view illustrating an end structure of a weighted body.
Figure 8B:
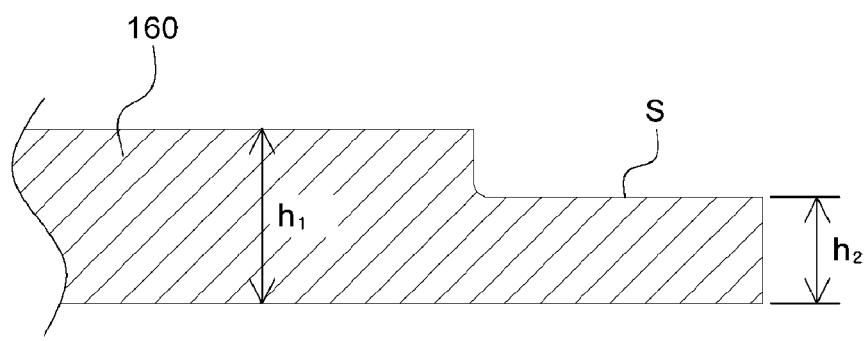
FIG. 8(b) is another partial cross-sectional view illustrating an end structure of a weighted body.
Figure 9:
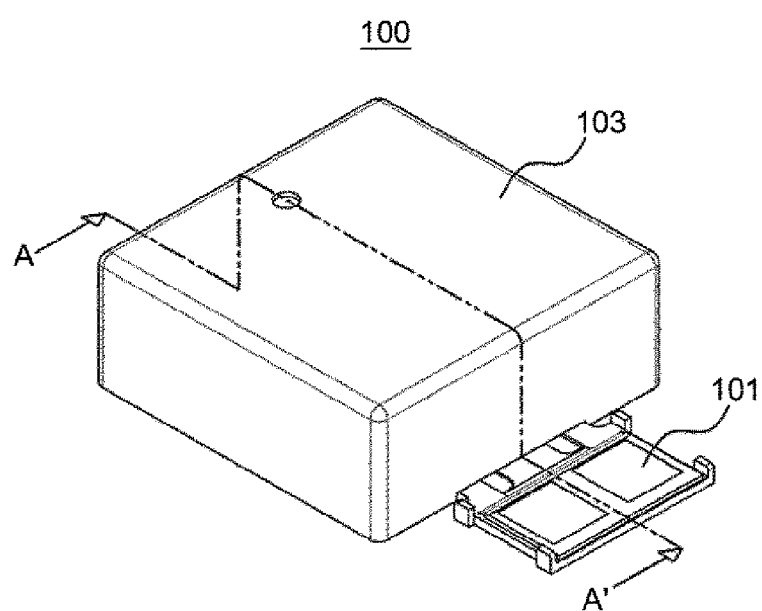
FIG. 9 is a perspective view of a vibration generating apparatus according to another embodiment of the present invention.
Figure 10:
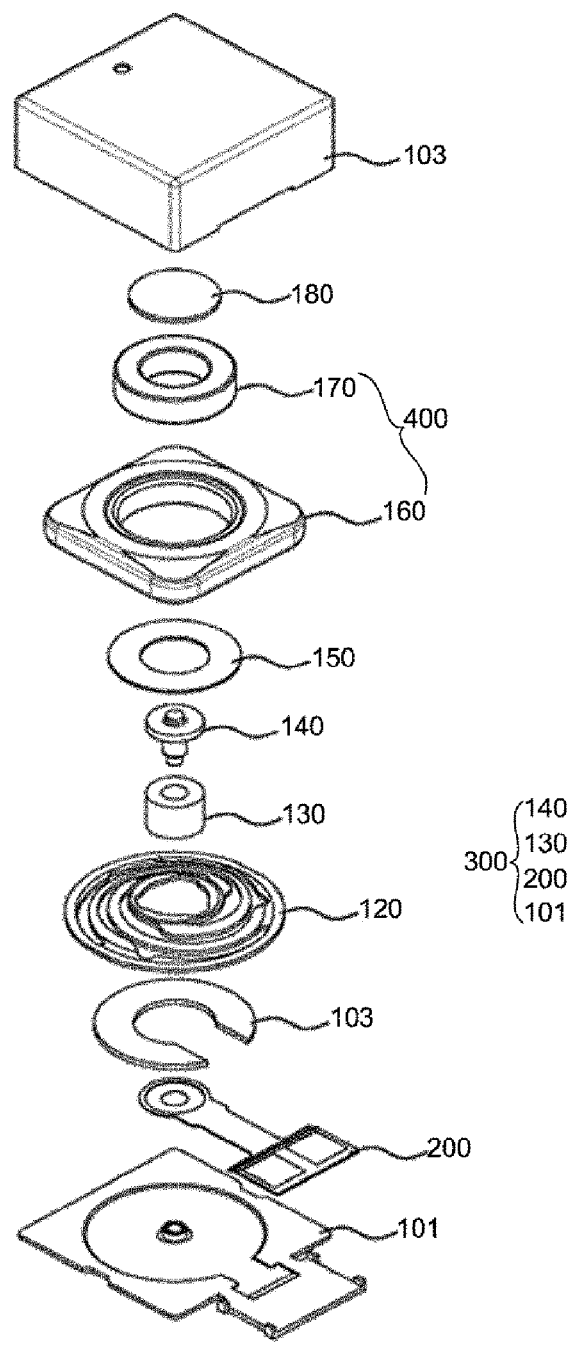
FIG. 10 is an exploded perspective view of a vibration generating apparatus according to another embodiment of the present invention.
Figure 11:
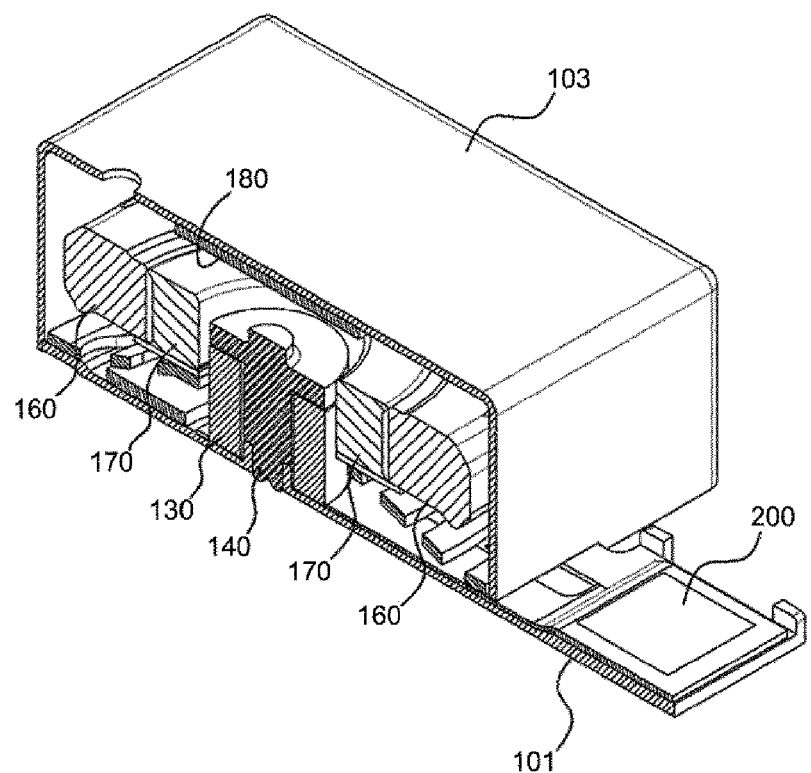
FIG. 11 is a sectional perspective view taken along a line A-A' in FIG. 9.

FIG. 8 is a partial cross-sectional view illustrating an end structure of the weighted body 160.

Referring to FIG. 8, a chamfer C or a step S may be formed at an outer upper surface corner portion of the weighted body 160 of the vibration generating apparatus 100 according to the embodiment such that a height h2 of an outer portion of the weighted body is lower than a height h1 of a center portion.

The weighted body 160 may swing from side to side due to the influence of a residual vibration during the up-and-down movement of the weighted body 160, thereby the end of the weighted body 160 colliding with the upper of the case 103. By forming the chamfered shape C or the step S on the upper side of the outer end of the weighted body 160 as shown in FIG. 8, it is possible to prevent the weighted body 160 from bumping against the case 103 even when the weighted body 160 is swung from side to side.

In other words, according to the present invention, it is possible to improve space utilization in assembling a set by changing the case 103 from a circular shape to a polyhedral shape, and it is also possible to minimize collision noise between the case 103 and the weighted body 160 during a linear vibration by forming a shape of the weighted body 160 to be inclined with respect to an inner surface of the case 103. A structure in which a damper is attached may be formed in a position where the inclined surface, the chamfer shape, or the step is formed, or a position corresponding thereto in the case 103.

The embodiments of the present invention have described an example in which a stator including a coil in a case, a vibrator including a permanent magnet, and an elastic member elastically supporting the permanent magnet to generate vibration are arranged, but are not limited thereto.

The teaching of the present invention may be applied to a structure of a vibration generating apparatus in which, for example, a permanent magnet is provided in a stator, and a coil coupled to a weighted body is provided in a vibrator.

Specifically, features of the present invention described above may be equally applied to a vibration generating apparatus including a stator comprising a permanent magnet fixed to a bracket or case, and a vibrator comprising a weighted body coupled to a coil.

Hereinafter, a vibration generating apparatus according to another embodiment of the present invention will be described in detail with reference to FIGS. 9 to 18.

Referring to FIGS. 9 to 13, the vibration generating apparatus 100 according to an embodiment of the present invention includes a vibrator 400 including a weighted body 160 and a permanent magnet 170, an elastic member 120 elastically supporting the vibrator 400, and a stator 300 including a case 103 for mounting the elastic member 120 and the case 103. The case 103 is generally rectangular in a plan view, and has a polyhedral shape in three dimensions view. The case 103 may be mounted on a terminal or the like while preventing a dead space from occurring.

The stator 300 includes a bracket 101 corresponding to a plane shape of the case 103, a circuit board 200 positioned on an upper surface of the bracket 101, a coil 130 mounted on the bracket 101 and electrically connected to the circuit board 200, and a yoke 140 positioned on an inner diameter surface of the coil 130. The coil 130 generates electromagnetic force corresponding to the permanent magnet 170 by a power source applied from the outside, and the electromagnetic force described above may be used as driving force for vibrating the vibrator 400.

The vibrator 400 includes a permanent magnet 170, a weighted body 160 coupled to an outer periphery of the permanent magnet 170, and a plate 150, in which the permanent magnet 170 has a hollow portion 162 at the center thereof, and the yoke 140 and the coil 130 of the stator 300 are aligned to penetrate into the hollow 162. In other words, the permanent magnet 170 may be disposed to surround a circumference of the coil 130. The structure of the vibrator 400 and the stator 300 may be reversed from those described above.

The elastic member 120 is disposed between the bracket 101 and the plate 150 to support the vibrator 400 so that the vibrator 400 may vibrate.

The case 103 according to the present embodiment may be various polygonal shapes other than an octagonal shape, but a rectangular shape is most preferable.

Figure 12:
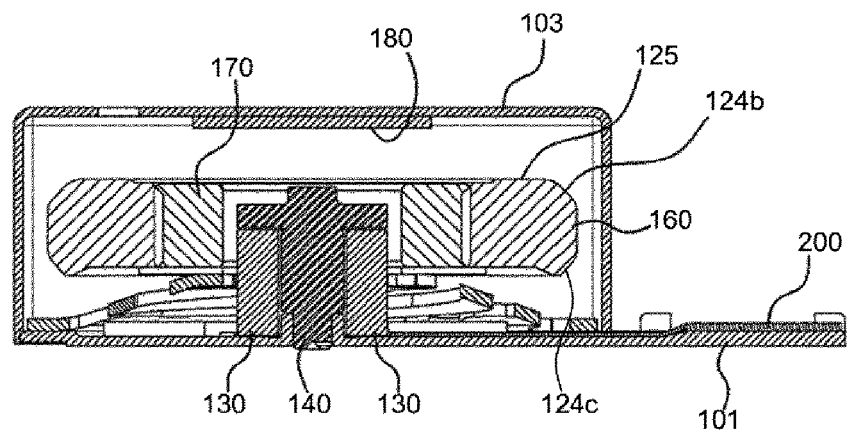
FIG. 12 is a sectional view taken on a line A-A' in FIG. 9.
Figure 13:
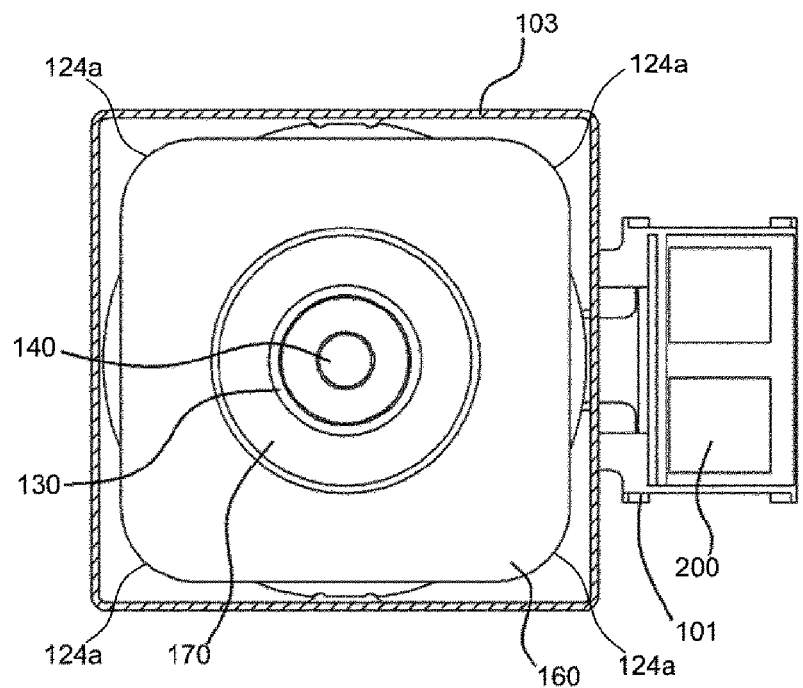
FIG. 13 is a cross-sectional view of a vibration generating apparatus according to another embodiment of the present invention.

FIG. 12 is a view illustrating a cross-section in a direction parallel to the vibration direction of the weighted body 160. FIG. 13 is a plan view of the vibration generating apparatus according to the present invention, showing a structure of a cross-section viewed in a plane state of the case 103 and the weighted body 160 (a cross-section in a direction perpendicular to the vibration direction).

Figure 14:
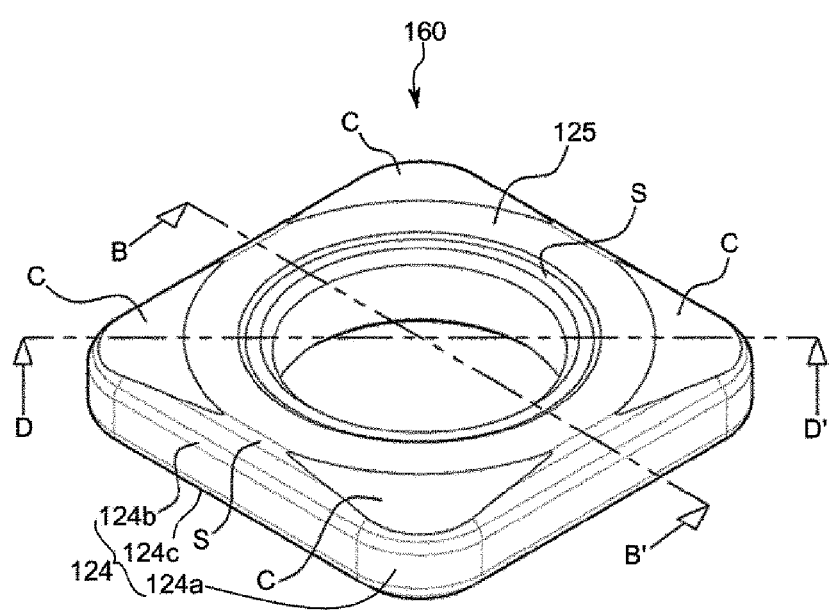
FIG. 14 is a perspective view illustrating a weighted body according to another embodiment of the present invention.
Figure 15:
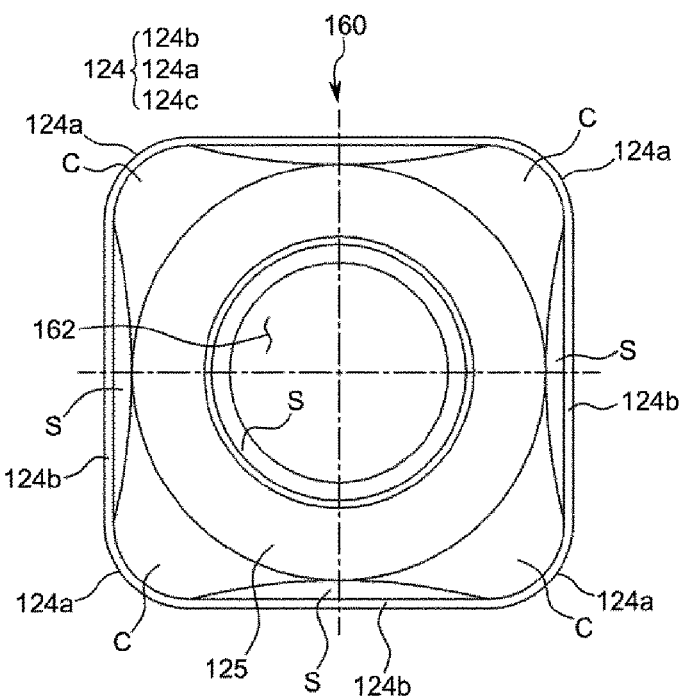
FIG. 15 is a plan view illustrating the weighted body in FIG. 14.
Figure 16:
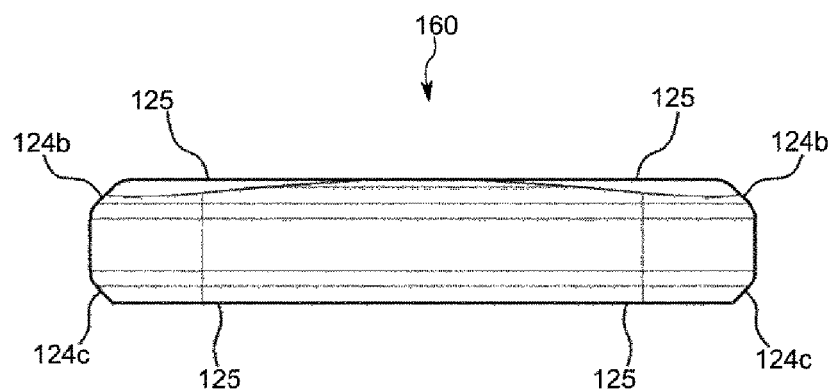
FIG. 16 is a front view illustrating the weighted body in FIG. 14.
Figure 17:
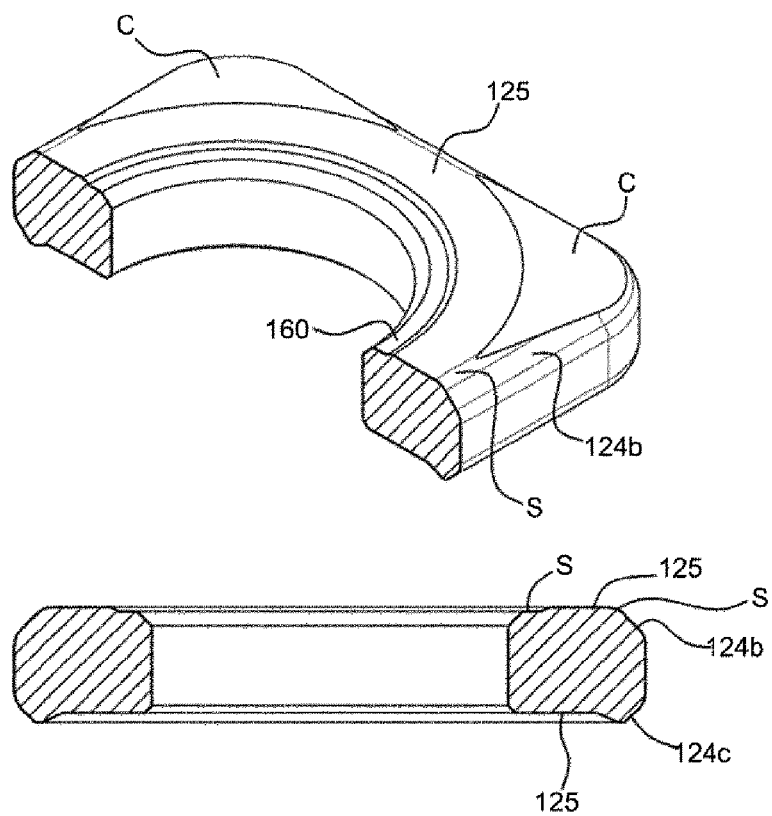
FIG. 17 is a sectional perspective view and a sectional view taken along a line B-B' in FIG. 14.
Figure 18:
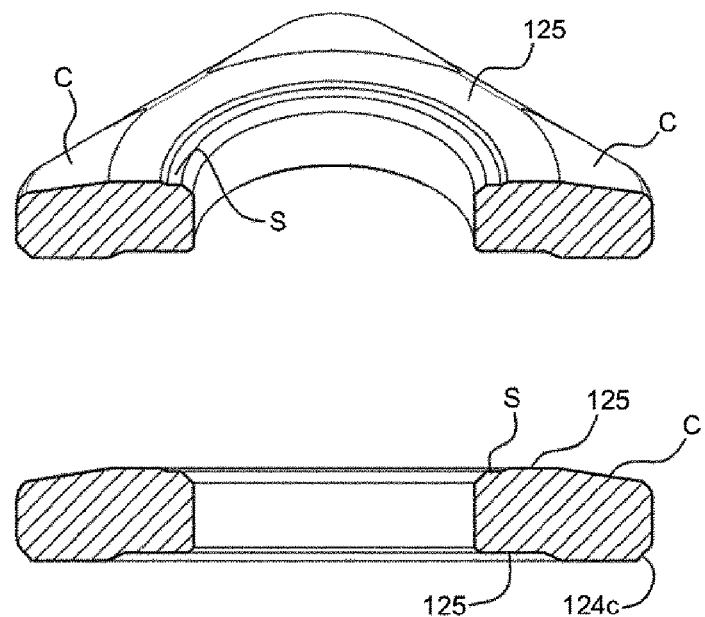
FIG. 18 is a sectional perspective view and a sectional view taken along a line D-D' in FIG. 14.

FIG. 14 is a perspective view illustrating a weighted body according to an embodiment of the present invention, FIG. 15 is a plan view illustrating the weighted body in FIG. 14, and FIG. 16 is a front view illustrating the weighted body in FIG. 14. FIGS. 17 and 18 are a sectional perspective view and a sectional view taken along a line shown in FIG. 14, respectively.

Referring these figures, the weighted body 160 generally has a polyhedral shape (or a rectangular shape in a plane perpendicular to a vibration axis) having a larger volume than that of a circular shape according to a shape of the case, but may have a polygonal structure including a curved surface 124 having a curvature R in which a side surface in a direction perpendicular to the vibration direction is curved, and a flat surface 125 extending from the curved surface, where the curved surfaces may have different radii of curvature and be formed continuously or discontinuously. In other words, two or more curved surfaces 124 having different curvatures may be continuously connected, or a flat surface may be disposed between the curved surfaces.

Specifically, the weighted body 160 according to the present embodiment is a polyhedron when the respective flat surface forming the weighted body 160 are extended, and the curved surfaces are formed at corners of an upper or a lower outer peripheral of the polyhedron.

The weighted body 160 according to the present invention may have a curved surface structure formed by rotating an inclined portion extending from a longitudinal plane 125 of the weighted body 160 to the outermost direction about a vertical center axis.

A shape of the weighted body 160 according to the embodiment may be an n-angular shape formed by extending the outermost straight line portion when viewed in a plan view, in which n is preferably a natural number of 4 or more.

The elastic member 133 is typically composed of using a leaf spring, and rotational force is inevitably generated in a direction perpendicular to the vibration direction when the vibrator 400 vibrates up-and-down. The aforementioned rotational force causes the weighted body 160 to rotate, and due to this, the weighted body 160 may collide with the case 103 to cause noise and damage. The vibration generating apparatus 100 according to the embodiment of the present invention may prevent or suppress collision between the weighted body 160 and the case 103 by the specific shape and structure of the weighted body 160 as described above.

In other words, a collision between side walls of the case 103 and the weighted body 160, which is generated by the rotational force of the elastic member 120, may be suppressed by a shape including the curved surface 124 of sides of the weighted body 160 and the flat surface 125 connected to the curved surface.

When a part of the upper surface of the weighted body 160 and inner walls of the case 103 collide with each other in a direction of the vibration axis due to an external impact, it may be minimized by forming a inclined portion S (FIG. 14) or a step C (FIG. 14) on the upper surface of the weighted body 160 as described above.

The curved surface 124 according to the present embodiment may include a first curved surface 124a, a second curved surface 124b, and a third curved surface 124c disposed at specific positions.

Specifically, the first curved surface 124a is a curved surface that curves an edge portion of the n-angular shape formed by extending the outermost straight line portion of the weighted body 160, when viewed in a plan view. The second curved surface 124b is a curved surface that curves an upper edge portion of the outermost surface with respect to a vertical center axis on a longitudinal cross-section of the weighted body 160. The third curved surface 124c is a curved surface that curves a lower edge portion of the outermost surface with respect to a vertical center axis on a longitudinal cross-section of the weighted body 160.

When the first curved surface 124a, the second curved surface 124b, and the third curved surface 124c described above are each limited to a specific range, the effect according to the present invention may be achieved.

Preferably, a radius of curvature of the first curved surface 124a according to the present embodiment may be a length of 5 to 25% of the shortest widthwise length of the weighted body 160 when viewed in a plan view. A radius of curvature the second curved surface 124b may be a length of 10 to 25% of the shortest length from the longitudinal vertical center axis of the weighted body 160 to the outermost surface. A radius of curvature the third curved surface 124c may be a length of 5 to 20% of the shortest length from the longitudinal vertical center axis of the weighted body 160 to the outermost surface.

The first curved surface 124a of the present invention prevents the weighted body 160 from interfering with the case 10 to cause noise or mechanical damage, when the weighted body 160 is not only vibrated in the vertical direction but also rotationally vibrated with the vertical axis as the rotation axis due to the elastic member 120 characteristics formed in a coil shape.

The second curved surface 124b, the third curved surface 124c, and the inclined portion C of the present invention prevent the weighted body 160 from interfering with the case to cause noise or mechanical damage, when a sudden impact is applied to the vibration generating apparatus from the outside and the weighted body 160 is swung from side to side in a cross-sectional view.

When the radius of curvature of the curved surface 124 is out of the range as mentioned above, the dead space may be increased or the weighted body 160 may collide with the inner side of the case 103, which is not preferable.

In other words, when a length of an outer periphery of the curved surface 124 is 10% smaller than a distance between an inner upper surface of the case 103 and an upper surface of the weighted body 160, there is no effect due to a structure in which the dead space is removed, whereas if it is 80% or more, a collision may occur between the upper surface of the weighted body and the inner upper surface of the case.

Further, when the length of an outer periphery of the curved surface 124 is less than 60% of the distance between an inner side surface of the case 103 and a side of the weighted body 160, there is also no effect due to the structure in which the dead space is removed, whereas if it is 90% or more, a collision may occur between the inner side surface of the case 103 and the side of the weighted body 160.

Turning to FIG. 15, the weighted body 160 according to the present embodiment may have a hollow 162 passing through the inside thereof.

It is preferable that a flat surface extending vertically from the hollow 162 is provided on the upper surface of the weighted body 160, and the inclined portion or the step is formed to extend outwardly from the flat surface.

As shown in FIGS. 14 to 18, the inclined portion C or the step S may be formed on the upper surface of the weighted body 160 according to the present embodiment.

According to the vibration generating apparatus 100 according to the embodiments of the present invention described above, it is possible to improve the vibration power and the response speed of the vibration generating apparatus by reducing the dead volume of the weighted body 160 and increasing the weight of the weighted body.

Further, it is possible to ensure the reliability of a product by preventing the degradation of the vibration characteristics and noise which may occur when the weighted body 160 rotates or swings from side to side besides the up-and-down movement. Moreover, it is possible to ensure high-quality vibration performance and design freedom by increasing space utilization of the vibration generating apparatus 100.

While the present invention has been particularly shown and described with reference to exemplary embodiments thereof, it will be understood by one of ordinary skill in the art that various changes in form and details may be made without departing from the spirit and scope of the invention as set forth in the following claims. Accordingly, when the modified embodiments essentially include elements of the claims of the present invention, all of which are considered to be included in the technical scope of the present invention.

What is claimed is:

1. A vibration generating apparatus, comprising:
   a bracket coupled to a rectangular case to form an inner space;
   a stator including a circuit board coupled to an upper surface of the bracket and a coil connected to the circuit board;
   a vibrator including a permanent magnet arranged on an exterior of the coil and a polygonal weighted body coupled to an outer circumferential surface of the permanent magnet, and configured to moves up-and-down; and
   an elastic member connecting the stator and the vibrator, having a spiral shape and elastically supporting the vibrator,
   wherein the weighted body has corners forming a polygonal shape, some of the corners of the weighted body face sides of the case, and the other corners of the weighted body face corners of the case.

2. The vibration generating apparatus of claim 1, wherein an internal angle of the weighted body facing a side of the case is greater than 135° and less than 180°.

3. The vibration generating apparatus of claim 1, wherein the weighted body is provided with a chamfer or a step on an upper surface of the weighted body.

4. The vibration generating apparatus of claim 1, wherein an internal angle of the weighted body facing a corner of the case is greater than 90° and less than 135°.

5. A vibration generating apparatus, comprising:
   a bracket coupled to a rectangular shaped case to form an inner space;
   a stator including a circuit board coupled to an upper surface of the bracket and a permanent magnet fixed to the bracket or the case; and
   a vibrator including a coil electrically connected to the circuit board to generate magnetic force corresponding to the permanent magnet and a polygonal weighted body coupled to the coil, and configured to moves up-and-down; and
   an elastic member connecting the stator and the vibrator, having a spiral shape and elastically supporting the vibrator,
   wherein the weighted body has corners forming a polygonal shape, some of the corners of the weighted body face sides of the case, and the other corners of the weighted body face corners of the case.

* * * * *